United States Patent [19]
Eberle et al.

[11] Patent Number: 6,022,420
[45] Date of Patent: Feb. 8, 2000

[54] PURGING COMPOUND

[75] Inventors: Johann Eberle, Pujols, France; Robert Schroots, Mies, Switzerland

[73] Assignee: E. I. du Pont de Nemours and Company, Wilmington, Del.

[21] Appl. No.: 09/027,088

[22] Filed: Feb. 20, 1998

Related U.S. Application Data

[60] Provisional application No. 60/040,031, Mar. 4, 1997.

[51] Int. Cl.⁷ .................. B08B 9/04; B08B 9/00; B08B 9/03
[52] U.S. Cl. .................. 134/8; 134/22.1; 134/22.11; 134/22.14; 134/22.19
[58] Field of Search .................... 425/225, 227; 264/39; 134/8, 22.1, 22.11, 22.14, 22.19

[56] References Cited

U.S. PATENT DOCUMENTS

| | | | |
|---|---|---|---|
| 3,125,547 | 3/1964 | Blatz | 260/45.5 |
| 4,904,735 | 2/1990 | Chapman, Jr. et al. | 525/199 |
| 5,064,594 | 11/1991 | Priester et al. | 264/127 |
| 5,089,200 | 2/1992 | Chapman, Jr. et al. | 264/127 |
| 5,266,639 | 11/1993 | Chapman, Jr. et al. | 525/200 |
| 5,707,569 | 1/1998 | Priester et al. | 264/39 |
| 5,710,217 | 1/1998 | Blong et al. | 525/199 |

*Primary Examiner*—Randy Gulakowski
*Assistant Examiner*—Yolanda E. Wilkins

[57] ABSTRACT

An extruder is purged of residual thermoplastic resin by passing purging compound through the extruder, the purging compound being particles of fluoropolymer which are non-melt flowing at the temperature of operation of the extruder.

6 Claims, 1 Drawing Sheet

PURGING COMPOUND

RELATED APPLICATIONS

This application claims the benefit of Provisional Application No. 60/040,031 filed Mar. 4, 1997.

FIELD OF INVENTION

This invention relates to compounds used to clean melt extruders to facilitate product changeover, e.g. extrusion of a different polymer or polymer of a different color, which compounds are often called purging compounds.

BACKGROUND OF THE INVENTION

Extruders of molten resin are available in many forms and for many purposes, e.g. extrusion of thermoplastic resin into extruded shapes such as tubes, coatings, or rods, extrusion of polymer for blown film, single screw and twin screw extruders, and injection molding. The terms extruders and extrusion used herein includes all these types of melt extrusion operations and apparatus, including the extrusion carried out in the course of injection molding. Such extruders have a heated extrusion barrel and one or two screws revolving within the barrel to compress, melt and extrude the resin melt through an orifice in the extrusion nozzle. When the extruder has to switch from one resin to a different resin or resin of a different color, the preceding resin contaminates the succeeding resin. Impurities created during the extrusion of the preceding resin, such as carbon residue which would form black specs or other contaminants may also be present, depending on the length of extrusion run on the preceding resin and its tendency to decompose under prolonged heating. The creation of such impurities in the resin can become a problem even without product changeover, i.e. affecting the quality of the product made from the original resin. Similarly, the start-up of an extruder without change of resin from the previous run can lead to contaminants present in the extruder adversely affecting the resultant product, whether an extrudate or an injection molding.

Purging compounds have been used with moderate success to clean out the extruder. In the case of product changeover, the purging compound is run through the extruder after extrusion of the preceding resin is finished, to clean out the extruder of the preceding resin, and this is followed by extrusion of the succeeding resin. The purging compound is used similarly to clean out contaminants formed during a long extrusion run, followed by introducing the same thermoplastic resin feed to the extruder, or to start up an extruder. Such purging compounds have included blends of polyamide/high density polyethylene (HDPE) for purging extruders of polyamide, low density polyethylene (LDPE) with additives, and polycarbonate, mixture of carboxylic acid, carbonate, and fatty acid derivatives available as CENPURGE® from Central Chemicals Co. Such purge compounds include polymeric materials and non-polymeric materials, but all are called purge compounds. Prior purging compounds have suffered from one or more of the following disadvantages: resin specificity, i.e. only work with certain preceding polymers, take too long to accomplish purging, become a source of contamination themselves of the succeeding resin, are too abrasive, causing undesired wear of extruder parts, and give off odor. Such compounds have also generally failed to purge the extruder of carbon residue from the extrusion of the preceding polymer. To purge the extruder of carbon residue adhered to the barrel and extrusion screw(s), the extruder typically has to be disassembled and the barrel and screw surfaces subjected to intense manual cleaning, including abrasion of the affected surfaces, followed by heating in the case of the screw to oxidize the carbon which may nevertheless remain after the intense manual cleaning. This is expensive in terms of extruder downtime, labor cost for the cleaning, the cost of an oven and its operation, and wear of the screw and barrel from the intense cleaning.

The need exists for a purging compound which is relatively universal in its applicability to extrusion of molten resin, inert so as not to react with the thermoplastic resin being purged, odor free, and economical to use, including to purge the carbon residue to eliminate the need for intense manual cleaning and heating of the screw.

SUMMARY OF THE INVENTION

The present invention satisfies this need. The purging compound used in the present invention comprises fluoropolymer which is in particulate form and which has no melt flow at the temperature at which purging of the extruder is carried out; generally the temperature at which purging is carried out is at least the extrusion temperature of the thermoplastic resin which is being purged (along with any contaminate). In the process of purging an extruder of the residue of thermoplastic resin by passing a purging compound through the extruder following extrusion of said thermoplastic resin, the improvement of the present invention comprises carrying out the passing step using the fluoropolymer purging compound just described.

DETAILED DESCRIPTION

Figure 1:
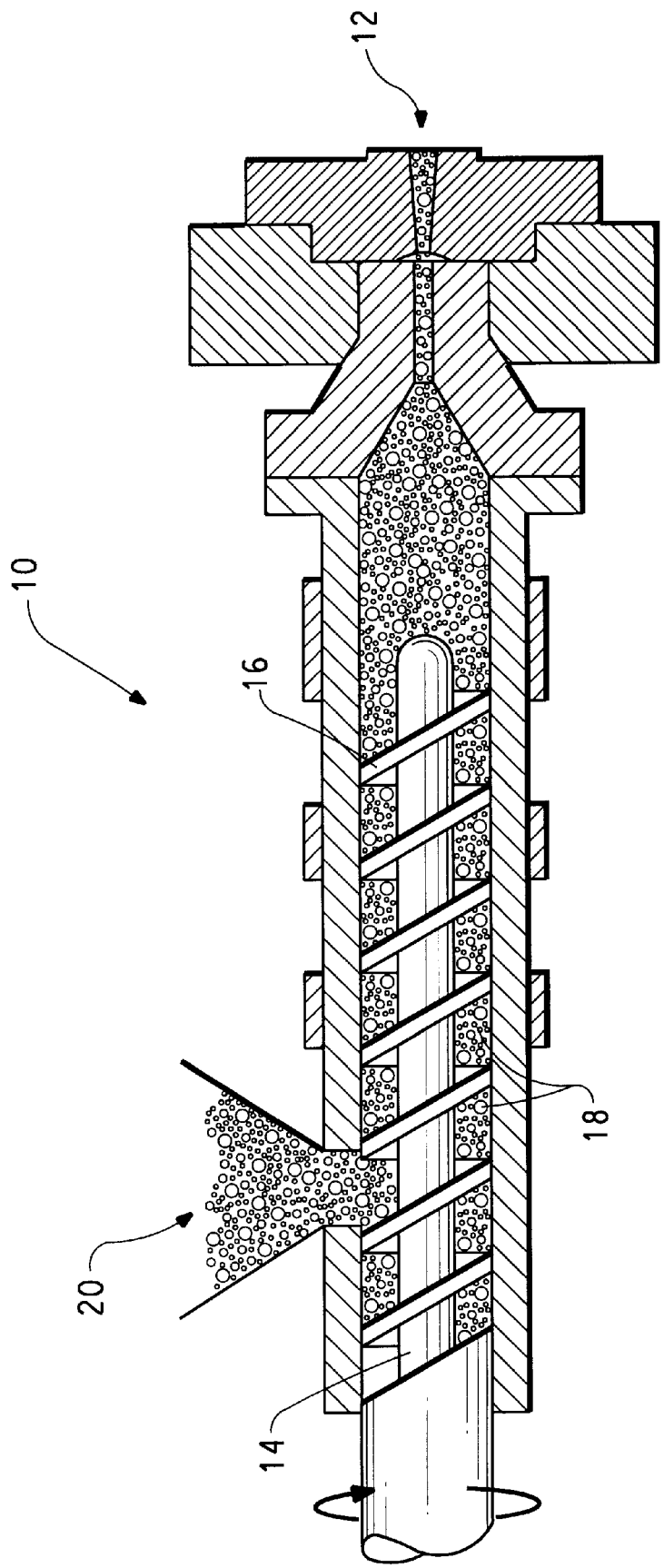
FIG. 1 is a cross-sectional view of an extruder 10 of the type which may be purged in accordance with the present invention. The extruder 10 illustrated has a nozzle 12 and screw 14 having flight 16. Particles 18 of fluoropolymer purging compound 20 are also shown.

The fluoropolymer purge compound used in the present invention can be polytetrafluoroethylene (PTFE) which is non-melt flowable, i.e has a melt viscosity of at least $1 \times 10^8$ Pa·s at 372° C., examples of which are the fine powder type and the granular type. The PTFE can consist solely of repeat units derived from tetrafluoroethylene or can also contain a small proportion, usually less than 1.0 wt% of comonomer, such as perfluoroolefin containing 3 to 8 carbon atoms or perfluoro(alkyl vinyl ether), wherein the alkyl group contains 1 to 8 carbon atoms. The comonomer modifies the PTFE but is used in such a small amount that the comonomer does not make the PTFE melt-flowable. Thus, the PTFE used in the present invention also includes PTFE modified with other monomer as well as PTFE which is unmodified, i.e. no other comonomer. Such PTFE has a melting temperature of greater than 320° C. and at least 327° C. in the case of PTFE which is unmodified.

The fluoropolymer purge compound can also be a melt-flowable fluoropolymer in which comonomers described above are present in a greater amount and the melt viscosity is on the order of $(1 \text{ to } 1000) \times 10^2$ Pa·s. These purge compounds, however, have high enough melting temperatures, that they can be used at lower temperatures in the purging operation, still adequate to purge the extruder of the thermoplastic resin, without incurring melt flow. Fluoropolymers having melt viscosities intermediate the non-melt flowable and melt flowable fluoropolymers can be used.

Perfluorinated fluoropolymers are preferred, but fluoropolymers in which some of the possible fluorine substituents are other atoms can be used. Therefore suitable fluoropolymers includes polychlorotrifluoroethylene (m. pt. 210°–220° C.), chlorotrifluoroethylene/ethylene copolymer (m. pt. 220°–245° C.), tetrafluoroethylene/ethylene copolymer (m. pt. 250°–280° C.), and polvinylidene fluoride (m. pt. 134°–178° C.). Small amounts of other comonomer can be present without adversely affecting the applicability of the fluoropolymer to the purging utility, it only being necessary that the fluoropolymer have a high enough melting temperature that it can be used at lower temperatures without melt flow to accomplish the desired purge. By way of example, the fluoropolymer preferably has a melt temperature of at least 200° C., and more preferably at least 250° C. The fluoropolymer if not perfluorinated preferably contains at least 35 wt% fluorine based on the total weight of the fluoropolymer.

The fluoropolymer purging compound is used in the form of particles, the size of which will depend on the size (internal diameter) of the extruder and the depth of the flights of the extruder screw. The screw will have at least one helical flight extending along its length. The particles should be smaller than the depth of the screw flight so that a plurality of fluoropolymer particles can build up and pack within the screw flight in the purging operation. As such, the particles will also be the proper size for feeding to the extruder. Thus, the particles will generally have an average diameter of 0.01 to 40 mm and can be spherical or irregular in shape, with the particular particle size chosen depending on the screw flight depth as just described.

The particles of fluoropolymer can be made by conventional methods, depending on the particular fluoropolymer used and particle size desired. For example, the melt flowable fluoropolymer can be melt extruded, followed by chopping up (cutting) the extrudate into short lengths to form the particles. In the case of PTFE, the fine powder can be used as made by coagulation of aqueous dispersion polymerization, and the granulate resin can be subjected to comminution. The particle size of the comminuted resin can be increased if desired such as by the well-known method of solvent-aided pelletization. In either case, the PTFE is sintered as a loose powder to form the purging compound. Alternatively, the granular resin can be in the form of a sintered shape, such as a rod or tube, and the rod or tube can be comminuted to obtain the purge particles already sintered. The melting of the melt flowable fluoropolymer and the sintering of the PTFE in the course of providing the particles for use as the purge compound can collectively be referred to as melt coalescing of the fluoropolymer or of the fluoropolymer particles having been melt coalesced. The coalescence is not particle to particle but is of the fluoropolymer within each particle. Of course, as explained above, this melt coalescence can be carried out on the particle form of the fluoropolymer or on a precursor to such form, e.g. extrudate, rod, or tube. The melt coalescence is carried out to form the purge compound which is fed to the extruder.

The fluoropolymer purging compound has sufficient hardness that it is able to scour the extruder and extruder screw by the extrusion purging operation to be described in detail hereinafter, to remove residual thermoplastic resin and even to remove carbon deposits from the extruder barrel and screw surfaces. For example the fluoropolymer particles will preferably have a Shore D hardness of 50–65. The particles of fluoropolymer forming the purging compound can also contain organic or inorganic additives which may improve further the purge provided by the fluoropolymer particles, for example, glass beads, talc or minerals to increase the hardness of the fluoropolymer. High temperature polymers such as polyphenylene sulfide dispersed in the particles also increases the particle hardness.

The purge operation is typically conducted by carrying out the following steps: The extrusion production by the extruder is stopped, i.e. the resin feed to the extruder is stopped and the extruder screw is run until the extruder seems empty of the resin. The extruder nozzle (extrusion head) which contains the extrusion die and filter, if any, can be removed from the extruder so that the end of the extruder screw is visible and the non-melt flowing purge compound is able to exit from the extruder. It is not necessary to remove the nozzle if the particles of the purge compound are small enough to pass through the extrusion orifice without undue pressure buildup. The temperature of the extruder should be at least as high as the temperature of extrusion of the thermoplastic resin. Preferably, however, the extruder is heated by about 5 to 10° C. hotter than the extrusion temperature so as to increase the fluidity of any residual resin in the extruder but not to decompose such residual resin into carbon. The extrusion temperature is considered to be the highest temperature to which the resin is heated, and is determined by thermocouples placed along the length of the extrusion barrel. The feed hopper and screw inlet is cleaned, followed by feeding the purge compound to the extruder. The operation of the screw feeds and compacts the purge compound as it traverses the length of the extruder barrel, practically forming a plug flow of the purge compound as it exits the extruder, removing the residual resin and contaminants such as carbon and carrying this along with the exiting purge compound. The amount of purge compound needed can be judged visually by the absence of contaminant and residual resin from the extruder. For example, about 3 kg of purge compound is generally sufficient to clean a 40 mm diameter (internal) single screw extruder. The extruder is run until all the purge compound appears to have exited the extruder. The extruder nozzle can be re-installed if it has been removed and the succeeding thermoplastic resin introduced to the extruder, the initial feed of which will sweep any residual purge compound from the extruder. The high melting temperature of the fluoropolymer, together with its non-stick characteristic and chemical inertness enables the extruder to be easily swept clean of the purge compound.

Using the foregoing procedure, the purging compound of PTFE (sintered fine powder) has been used to clean out extruders of the following thermoplastic resins at the temperature indicated:

CRASTIN® polyethylene terephthalate—260°–290° C.

CRASTIN® polybutylene terephthalate—260°–290° C.

DELRIN® acetal resin—260°–290° C.

HYTREL® thermoplastic elastomer—240°–290° C.

SURLYN® ionomer resin—260°–290° C.

RYNITE® polyester engineering thermoplastic resin—270°–300° C.

ZYTEL 6 and 66 nylon resins—270°–320° C.

MINLON® engineering thermoplastic resin—270°–320° C.

The efficiency of the purge process was enhanced by increasing the purge temperature towards the end of the purge when little to no amount of the thermoplastic resin being purged was present any longer in the extruder, with the maximum purge temperature not exceeding 350° C. The carbon residue and other contaminants were completely removed from the extruders in many cases without the need for extruder disassembly, and when disassembly was necessary, only a light brushing was required to completely remove the carbon and any other contaminant present.

The melt flowable fluoropolymers can be used in the same way to purge the relatively low melting thermoplastic resins such as the ethylene and propylene polymers including copolymers.

It is claimed that:

1. In the process of purging an extruder of thermoplastic resin after an extrusion run by passing a purging compound through the extruder, said extruder containing a residual thermoplastic resin to be purged, the improvement comprising carrying out said passing with the extruder being at a passing temperature and wherein said purging compound is fluoropolymer particles, the fluoropolymer of said particles being non-melt flowing at said passing temperature.

2. In the process of claim 1 wherein said extruder has an extrusion nozzle and said improvement further comprises removing said nozzle prior to carrying out said passing.

3. In the process of claim 1 wherein said purging compound comprises polytetrafluoroethylene.

4. In the process of claim 1 wherein said extruder has a screw having a length and having at least one screw flight along said length, said flight having a flight depth, and said particles are smaller in size than said flight depth to permit packing of said particles in said flight.

5. In the process of claim 1 wherein said passing temperature is at least the temperature normally used for extrusion of said thermoplastic resin.

6. In the process of claim 1 wherein said particles are melt coalesced prior to use as a purging compound.

* * * * *